US009771832B2

(12) United States Patent
Iaquaniello et al.

(10) Patent No.: US 9,771,832 B2
(45) Date of Patent: Sep. 26, 2017

(54) METHOD FOR MODIFYING A SOLAR THERMAL POWER PLANT OPERATING ON CONVENTIONAL OIL BASED TECHNOLOGY INTO A HYBRID SOLAR THERMAL POWER PLANT AND SUCH A HYBRID SOLAR THERMAL POWER PLANT

(71) Applicants: STAMICARBON B.V., Sittard (NL); ENEA—CASACCIA RESEARCH CENTRE, Rome (IT); YEDA RESEARCH AND DEVELOPMENT CO., LTD., Rehovot (IL)

(72) Inventors: Gaetano Iaquaniello, Rome (IT); Daniela Capoferri, Rome (IT); Fabrizio Fabrizi, Rome (IT); Michael Epstein, Rehovot (IL)

(73) Assignees: STAMICARBON B.V. (NL); ENEA—CASACCIA RESEARCH CENTRE (IT); YEDA RESEARCH AND DEVELOPMENT CO., LTD. (IL)

( * ) Notice: Subject to any disclaimer, the term of this patent is extended or adjusted under 35 U.S.C. 154(b) by 0 days.

(21) Appl. No.: 14/400,268

(22) PCT Filed: May 10, 2013

(86) PCT No.: PCT/NL2013/050351
§ 371 (c)(1),
(2) Date: Nov. 10, 2014

(87) PCT Pub. No.: WO2013/169111
PCT Pub. Date: Nov. 14, 2013

(65) Prior Publication Data
US 2015/0128595 A1 May 14, 2015

(30) Foreign Application Priority Data
May 10, 2012 (EP) .................................. 12167509

(51) Int. Cl.
*F01K 13/00* (2006.01)
*F01K 3/06* (2006.01)
(Continued)

(52) U.S. Cl.
CPC .............. *F01K 13/00* (2013.01); *F01K 3/004* (2013.01); *F01K 3/08* (2013.01); *F01K 3/24* (2013.01);
(Continued)

(58) Field of Classification Search
CPC . F03G 6/00; F03G 6/003; F03G 6/005; F03G 6/008; F03G 6/065; F03G 6/067
(Continued)

(56) References Cited

U.S. PATENT DOCUMENTS 5,685,151 A * 11/1997 Ross ..................... F03G 6/067
60/641.15
6,996,988 B1 * 2/2006 Bussard .................... F01K 3/12
60/641.15
(Continued)

FOREIGN PATENT DOCUMENTS

DE    10 2010 027226    11/2011
WO    WO2011/053863    5/2011
(Continued)

*Primary Examiner* — Mark Laurenzi
*Assistant Examiner* — Mickey France
(74) *Attorney, Agent, or Firm* — Knobbe, Martens, Olson & Bear, LLP (57) ABSTRACT

A method for modifying a solar thermal power plant operating on conventional oil based technology into a hybrid solar thermal power plant includes: providing an oil-based solar thermal power plant, which includes a solar collection system with at least one radiation absorber tube containing a heat transfer oil to be heated by the solar collection system; providing a molten salts solar thermal power plant, which includes a solar collection system to heat a molten salts
(Continued)

mixture; and coupling the respective plants such that the hybrid solar thermal power plant is configured to heat medium temperature steam generated by the oil based solar power plant by the molten salts mixture thereby producing high temperature steam and subsequently supplying it to a steam turbine to generate electricity.

19 Claims, 5 Drawing Sheets

(51) Int. Cl.
*F01K 7/16* (2006.01)
*F03G 6/00* (2006.01)
*F01K 3/00* (2006.01)
*F01K 3/24* (2006.01)
*F01K 7/22* (2006.01)
*F22B 1/00* (2006.01)
*F22B 1/02* (2006.01)
*F01K 3/08* (2006.01)

(52) U.S. Cl.
CPC .................. *F01K 7/16* (2013.01); *F01K 7/22* (2013.01); *F03G 6/005* (2013.01); *F22B 1/006* (2013.01); *F22B 1/028* (2013.01); *Y02E 10/46* (2013.01); *Y02E 20/16* (2013.01)

(58) Field of Classification Search
USPC .............................................. 60/641.8–641.15
See application file for complete search history.

(56) References Cited

U.S. PATENT DOCUMENTS

| | | | |
|---|---|---|---|
| 2010/0212318 A1* | 8/2010 | Schaal | F01K 7/22 60/641.15 |
| 2011/0277469 A1* | 11/2011 | Brenmiller | F03G 6/067 60/641.8 |
| 2013/0133324 A1* | 5/2013 | Reynolds | F03G 6/065 60/641.15 |
| 2013/0269682 A1* | 10/2013 | Cuthbert | F01K 3/004 126/645 |

FOREIGN PATENT DOCUMENTS

| | | |
|---|---|---|
| WO | WO2011/067773 | 6/2011 |
| WO | WO2012/050788 | 4/2012 |

* cited by examiner

PRIOR ART

Fig. 1

PRIOR ART

METHOD FOR MODIFYING A SOLAR THERMAL POWER PLANT OPERATING ON CONVENTIONAL OIL BASED TECHNOLOGY INTO A HYBRID SOLAR THERMAL POWER PLANT AND SUCH A HYBRID SOLAR THERMAL POWER PLANT

FIELD OF THE INVENTION

The present invention relates to the field of solar thermal power plants operating on conventional oil based technology.

BACKGROUND

Solar thermal power plants operating on conventional oil based technology are known from practice. Such known conventional oil based solar thermal power plants comprise a solar collection system having one or more tube radiation absorbers and a plurality of trough collectors, such as single axis parabolic reflectors or Fresnel collectors configured to receive and reflect incoming solar radiation onto a radiation absorber, which is formed as a tube. A thermal fluid, constituting a heat transfer medium, which is typically a liquid such as oil, flows within the radiation absorber tube. The thermal energy transported by the thermal fluid is used to generate steam which in turn is expanded into a turbine, in order to generate electricity in a conventional way, by coupling the axle of the turbine to a generator. Then, the steam is condensed and recycled back to a heat exchanger system. The cycle to transfer steam into electricity may be more efficient at high steam temperatures. However, the oil based thermal fluid may dissociate or otherwise break down or become less effective at transferring heat if said heat transfer media operate at very high temperatures. Due to this restricting behaviour, conventional plants generating solar thermal energy are typically limited to operate at about 400° C. At such temperature the overall efficiency of the cycle to transfer steam into electricity may be limited to less than 32%.

An alternative known solar thermal power plant may be based on using molten salts as heat transfer fluid (HTF). Such a solar thermal power plant always needs to operate at a temperature higher than the solidification temperature of the molten salts (around 240° C. for the Na/K nitrates mixture) and can be used to an operating temperature of approximately 550° C. Auxiliary heaters or boilers may additionally be used. However, the known solar thermal power plants may still have efficiency problems.

Therefore, it is an object of the present invention to provide a method for modifying a solar thermal power plant operating on conventional oil based technology such that the overall efficiency of the cycle to transfer steam into electricity of said solar thermal power plant may be improved.

SUMMARY OF THE INVENTION

According to one aspect of the invention a method for modifying a solar thermal power plant operating on conventional oil based technology into a hybrid solar thermal power plant is provided, wherein the method comprises providing an oil based solar thermal power plant comprising a solar collection system with at least one radiation absorber tube containing a heat transfer oil to be heated by means of the solar collection system, providing an additional solar thermal plant operating on a molten salts mixture, wherein the molten salts solar thermal power plant comprises a solar collection system to heat a molten salts mixture, and coupling of the molten salts solar thermal power plant to the oil based solar thermal power plant such that the hybrid solar thermal power plant is configured to heat medium temperature steam that is generated by the oil based solar power plant by means of the molten salts mixture thereby producing high temperature steam, and subsequently supplying it to a steam turbine to generate electricity.

With such a method for modifying a conventional oil based solar thermal power plant into a hybrid power plant the thermal cycle efficiency of the conventional oil based solar thermal power plant is increased due to the use of molten salts. It was found by applicant that by integrating the oil based solar thermal power plant and the additional molten salts based solar thermal power plant into a hybrid system, the thermal efficiency can be increased up to 45%, which is almost 20% higher than achievable in the conventional oil based solar thermal power plant. With such a hybrid system, the heat generated by the oil based solar power plant generates a first steam flow that may be supplied to the steam turbine to generate electricity. The steam flow is then heated by the molten salts mixture to obtain a higher temperature steam that is subsequently provided to the steam turbine as well to generate electricity. Instead, the first steam flow may be heated to a higher temperature by the molten salts mixture before being supplied to the steam turbine. Subsequently, this heated steam is provided to the steam turbine to generate electricity.

A further advantage of such a hybrid system lies in the fact that the operation time of the hybrid thermal solar power plant is increased compared to the operation time of the conventional oil based solar thermal power plant. Besides, the hybrid system is a safer system than the conventional oil based solar thermal power plant due to the fact that usage and storage of molten salts is less hazardous than usage and storage of hot oil. Furthermore, in the hybrid system of the invention, the molten salt handling system is less complicated than the oil handling system or a solar power plant based exclusively on molten salt as heat transfer medium since it only exchanges heat with medium temperature steam which is above the melting temperature of the molten salt. The hybrid system further enables using the existing equipment of the oil based solar thermal power plant and the molten salts based solar thermal power plant to the fullest.

Preferably, in the hybrid solar thermal power plant, the oil based solar thermal power plant is configured for providing saturated steam to the solar thermal power plant. In the oil based solar thermal power plant, the saturated steam will be heated to a temperature of 300-345° C., preferably to a temperature of 310-320° C., for example 315° C. These temperatures correspond to a pressure of about 85 bar for saturated steam of 300° C. to a pressure of about 150 bar for saturated steam of 345° C. To produce the saturated steam at said temperatures, the hot oil temperatures in the oil based solar thermal power plant will be in the range of 340-380° C., preferably between 340-360° C., more preferably between 345-350° C. Consequently, due to the relatively low temperatures of the hot oil, the bulk temperature and the film temperature of the hot oil in the heat exchanger of the oil based solar thermal power plant will be relatively low as well, at least lower than the bulk temperature and the film temperature in conventional oil based solar thermal power plants or in hybrid solar thermal power plants in which the oil based thermal power plant is configured to superheat the steam. Thus, in the hybrid solar thermal power plant according to the invention, degradation of the hot oil will be minimized or at least significantly reduced, thereby extending the lifetime of the oil and preventing issues like coke formation in the heat exchanger of the oil based thermal power plant which may lead to fouling and a reduced heat transfer coefficient of said heat exchanger.

Preferably, in the hybrid solar thermal power plant, the solar thermal power plant is configured for subsequently superheating the steam to at least 450° C., preferably to at least 500° C., for example between 500° C. and 1000° C. For instance, when using Na/K nitrates as molten salts mixture, the steam may be heated to a temperature of approximately 500° C. By heating/reheating the steam to said temperatures and subsequently supplying it to the turbine, the efficiency of the turbine is maximized.

It is noted that in this description 'heating' is understood to mean the input of energy in general, and can specifically mean steam generation by vaporizing water, or increasing the temperature of saturated steam thereby producing superheated steam or further increasing the temperature of already superheated steam or a combination of the above. In this description, 'superheating' the steam is understood to mean conversion of saturated steam into superheated steam and 'reheating' is understood to mean increasing the temperature of the exhaust steam coming from the steam turbine.

It is further noted that throughout this text, low temperature steam is defined as steam having a temperature below approximately 300° C. Medium temperature steam is defined as steam having a temperature of between 300-450° C. When generating saturated steam, typical temperatures thereof are between 300-345° C. and when generating superheated steam, typical temperatures thereof are between 360-380° C. High temperature steam may be defined as steam having a temperature above 450° C., preferably above 500° C. and more preferably above 540° C.

The heated steam may be reheated or superheated at a pressure ranging between approximately 50-120 bar. It is noted that low pressure steam throughout this description is defined as steam kept under a pressure of less than approximately 10 bar. Medium pressure steam may be defined as steam kept under a pressure of approximately between 10 and 60 bar and high pressure steam may be defined as steam kept under a pressure of approximately at least 60 bar.

In further elaboration of the invention, the method further comprises adding a storage facility to store the molten salts mixture and heat the medium temperature steam coming from the oil based solar power plant and/or to heat boiler feed water to generate and to heat steam by means of the stored hot molten salts mixture. Due to such storage facility, the operation time of the hybrid thermal solar power plant is increased. For example it is possible to extend the operation time by 30 minutes to 36 hours, preferably by 1 hour to 24 hours, more preferably by 2 to 8 hours. Consequently, dependent on the extension of operation time, the volume of the storage facility may be defined.

According to another aspect of the invention, the method comprises providing a back-up boiler system for heating the molten salts mixture and/or preheating boiler feed water. Such a back-up boiler system may be provided to heat the molten salts mixture and/or to preheat the boiler feed water when there is minimum solar radiation available, for instance at night or due to bad weather conditions. The back-up boiler system may additionally or instead be configured to provide other thermal services.

Preferably, the method comprises providing the turbine with a reheating section in fluid connection with the solar collection system of the molten salts solar thermal power plant, for reheating the steam coming from a first turbine section before supplying it to a second turbine section to generate electricity. The exhaust steam that is coming from the first turbine section may be reheated by means of the molten salts mixture that is heated, for instance to approximately 550° C., by means of the solar collection system of the molten salts solar thermal power plant. Subsequently, the reheated steam is supplied to the second turbine section to generate electricity and thus to maximize the efficiency of the turbine. Furthermore, the solar collection system may be operationally coupled to the storage facility such that heated molten salts mixture can be stored in the storage facility in which facility steam generated by the oil based solar thermal power plant is heated, for instance at a temperature of 520° C.-540° C. and a pressure ranging between approximately 50-120 bar before it is supplied to the first turbine section to generate electricity. Instead, the method may comprise providing the turbine with a reheating section in fluid connection with the solar collection system of the molten salts thermal power plant, for reheating the steam coming from the oil based thermal power plant to a higher temperature before supplying it to a turbine section of the turbine.

Additionally to providing the reheating section of the turbine in fluid connection with the solar collection system of the molten salts based solar thermal power plant, the reheating section may, according to a further aspect of the invention, be provided in fluid connection with an additional solar collection system configured for heating a molten salts mixture to reheat the steam coming directly from the oil based thermal power plant or coming from the first turbine section before supplying it to the second turbine section to generate electricity and/or for heating the molten salts mixture, for instance in an additional storage facility, to heat the steam generated from the supplied boiler feed water. Generating steam by means of vaporization of the supplied boiler feed water and subsequently heating the steam for instance to approximately 520-540° C. provides the advantage that the turbine is able to generate electricity even when there is no solar radiation available to heat the molten salts mixture by means of the solar collection system.

Also, in addition, a hot oil/cold molten salts mixture heat exchanger may be provided that heats the molten salt mixture supplied by the storage facility by means of the oil that is heated by the solar collection system of the oil based solar thermal power plant. Such heat exchanger may be provided in fluid connection with a molten salts mixture storage tank and in fluid connection with the storage facility of the molten salts based solar thermal power plant. The cold molten salts mixture coming from the cold molten salts tank is heated by means of the hot oil of the oil based solar thermal power plant. The heated molten salts mixture may then be provided to the molten salts storage facility of the molten salts based solar thermal power plant. The molten salts storage facility is configured to generate superheated steam, for instance at 520-540° C., also when there is no solar radiation available, for instance during bad weather conditions. Furthermore, in case of absence of solar radiation, medium temperature molten salts mixture coming from the bottom of the molten salts storage facility is supplied to the hot oil/cold molten salts mixture heat exchanger to heat the cold oil in the oil based solar thermal power plant in reverse mode.

The invention also relates to a hybrid solar thermal power plant, preferably obtained by means of the above described method, said hybrid solar thermal power plant comprising an oil based solar thermal power plant with a solar collection system having at least one radiation system with at least one radiation absorber tube in which heat transfer oil is received to be heated by means of the solar collection system, wherein the hybrid solar thermal power plant also comprises a molten salts solar thermal power plant with at least one solar collection system to heat a molten salts mixture and a storage facility configured to store the heated mixture and/or to exchange heat from the mixture to heat medium temperature steam supplied by the oil based thermal power plant, wherein a steam turbine is provided to generate electricity by means of the heated medium temperature steam.

Preferably, in the hybrid solar thermal power plant, the oil based solar thermal power plant is configured for providing saturated steam to the solar thermal power plant. In the oil based solar thermal power plant, the saturated steam will be heated to a temperature of 300-345° C., preferably to a temperature of 310-320° C., for example 315° C. These temperatures correspond to a pressure of about 85 bar for saturated steam of 300° C., a pressure of about 100 bar for saturated steam of 315° C. to a pressure of about 150 bar for saturated steam of 345° C. To produce the saturated steam at said temperatures, the oil based solar thermal power plant is configured to heat and/or keep the hot oil at a temperature the range of 340-380° C., preferably between 340-360° C., more preferably between 345-350° C.

Preferably, the solar based thermal power plant is configured to heat the steam to a temperature of at least 450° C., preferably to at least 500° C., for example between 500° C. and 1000° C. Such a solar thermal power plant provides similar advantages as described with the back-up boiler system according to the invention.

According to another aspect of the invention, the plant may comprise a back-up boiler system to heat the molten salts mixture and/or to preheat the boiler feed water, for instance to maximize operation time of the hybrid solar thermal power plant in case of absence of solar radiation.

Also the plant may comprise an additional solar collection system configured for heating a molten salts mixture for heating the steam generated from the heated boiler feed water and/or to reheat the steam coming from the first turbine section before supplying it to the second turbine section to generate electricity.

The aforementioned and other features and advantages of the invention will be more fully understood from the following detailed description of certain embodiments of the invention, taken together with the accompanying drawings, which are meant to illustrate and not to limit the invention.

BRIEF DESCRIPTION OF THE DRAWINGS

It is noted that identical or corresponding elements in the different drawings are indicated with identical or corresponding reference numerals.

DETAILED DESCRIPTION

Figure 1:
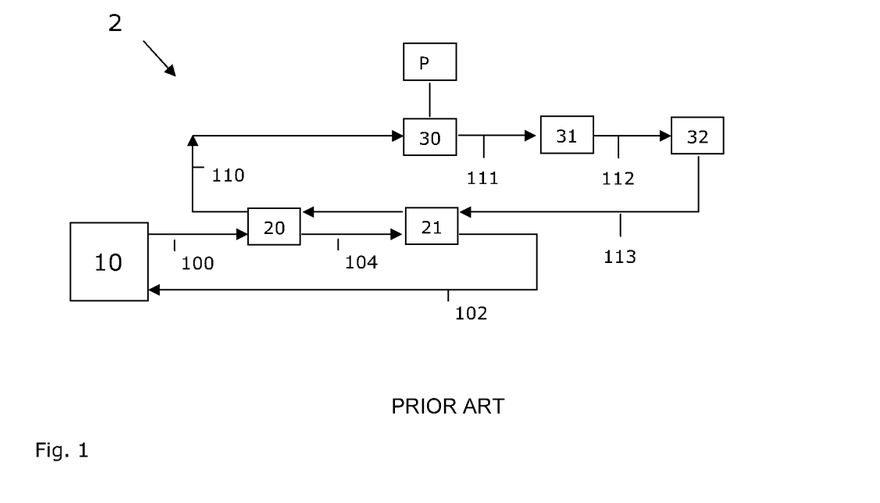
FIG. 1 shows a schematic diagram of a prior art solar thermal plant operating on conventional oil based technology.

In FIG. 1, an example of a prior art solar thermal power plant 2 based on conventional oil based technology is shown. The solar thermal power plant 2 comprises a solar collection system 10. The solar collection system 10 comprises one or more radiation absorber tubes and a plurality of trough collectors, such as single axis parabolic reflectors. Alternatively, the solar collection system 10 may be provided with any suitable means for concentrating solar radiation, such as Fresnel collectors. The radiation absorber tubes contain a thermal fluid used as heat transfer fluid, such as diathermic oils which are commercially available, for instance commercially available under the trade name Terminal® VP1. Flowing inside the radiation absorber tubes, the heat transfer fluid is heated by the exposure to concentrated solar radiation. The heat transfer fluid may be heated to an upper threshold temperature that has to be chosen as the highest safe working temperature for the heat transfer fluid itself, i.e., wherein the thermal fluid remains substantially stable and does not dissociate or have its thermal properties adversely offended by the high temperature. The upper threshold temperature may be around 400° C. for the diathermic oil Terminal® VP-1.

The heat transfer oil is circulated, by suitable pumps (not shown) to provide a heat source to produce the steam of the electric power plant.

The hot oil flows (arrow 100) from the solar collection system 10 at a temperature around 400° C. and enters the first heat exchanger 20, where the saturated steam is superheated at 385-388° C. at a pressure that can range from 60-102 bar (6.0- to 11.0 MPa). The partially cooled hot oil flows (arrow 104) then into the heat exchanger system 21, which constitutes a steam generation/boiler feed water train and preheater train and comprises two or more heat exchangers. The cold oil at a temperature of 300° C. is recycled back to the solar collection system 10 (arrow 102).

The superheated steam (arrow 110), flows from the first heat exchanger 20 to the steam turbine 30. In the steam turbine 30, power P is extracted from the steam by expanding it serially into up to six turbine stages. The exhaust power steam (arrow 111), is condensed in the steam condenser, 31, and then moved (arrow 112) to the degasifier 32 to eliminate any trace of oxygen or other contaminants. From there the boiler feed water (arrow 113) is recycled back to the heat exchanger system 21.

Figure 2:
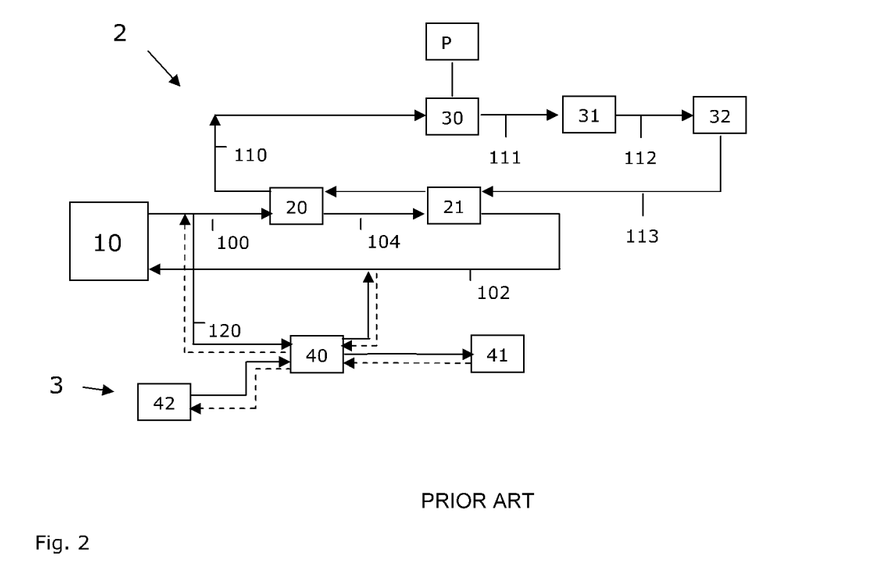
FIG. 2 shows a schematic diagram of a prior art solar thermal power plant operating on conventional oil based technology comprising a molten salt storage system.

In FIG. 2, a conventional oil based solar thermal power plant 2 is shown. Said plant 2 is similar to the plant 2 as shown and described with FIG. 1. However, the plant 2 of FIG. 2 additionally comprises a molten salts storage system 3. The molten salts storage system 3 comprises a heat exchanger train 40 configured to preheat cold molten salt stored in the molten salts storage tank 42. The hot molten salts mixture is accumulated into the hot molten salts storage tank 41 during the day. During lack of solar radiation, for instance during the might or in case of bad weather conditions, hot molten salts mixtures is supplied from the hot molten salts storage 41 to the heat exchanger train 40 in reverse mode (following dotted lines) to heat oil which is then provided to the first heat exchanger 20 (arrow 120) such that steam can be generated.

Figure 3:
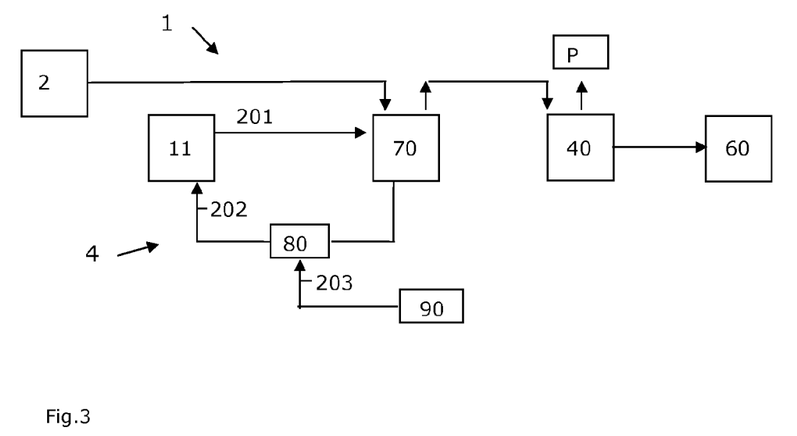
FIG. 3 shows a schematic diagram of a first embodiment of the hybrid solar thermal power plant according to the invention.

In FIG. 3 a first embodiment of a hybrid solar thermal power plant 1 according to the invention is shown. The hybrid solar thermal power plant 1 comprises an oil based solar thermal power plant 2 as described with FIG. 1. The hybrid solar thermal power plant 1 is provided by modifying the oil based solar thermal power plant 2 by providing an additional solar thermal power. plant 4 operating on a molten salts mixture. Said plant 4 comprises a solar collection system 11 in thermal connection with the molten salts thermal fluid to heat said molten salts mixture. A first molten salts storage facility 70 is provided in fluid connection (arrow 201) with the solar collection system 11 to store the heated molten salts mixture and to heat, superheat or reheat the steam coming from the oil based solar thermal power plant 2. In the oil based solar thermal power plant 2, the oil may be heated to a temperature of 340-380° C., preferably between 340-360° C., more preferably between 345-350° C. to produce saturated steam with a temperature of 300-345° C., preferably with a temperature of 310-320° C., for example 315° C., under a pressure ranging from approximately 85-150 bar. In the solar thermal power plant 4, the steam is superheated to a temperature of approximately 520-540° C. under a pressure ranging form 50-120 bar. Another molten salts storage facility 80 is provided downstream the first storage facility 70. Said second storage facility 80 is provided in fluid connection with an auxiliary boiler 90. In use, relatively cold molten salts mixture, having a temperature of approximately 400-420° C. from the bottom of the second storage facility 80 is supplied back (arrow 202) to the solar collection system 11 by means of suitable pumps (not shown). The second storage facility may also be configured for generating steam from the relatively cold molten salts mixture coming from the first storage facility 70. The auxiliary boiler 90 is configured for heating the molten salts mixture by means of burning bio-fuel or auxiliary fuel, to preheat boiler feed water and/or to provide other thermal services, for instance during the night, to continue the production of superheated steam for stable operation of the turbine 40. Exhaust steam coming from the steam turbine 40 is condensed in the condenser 60. Thus, in the hybrid solar power plant 1 according to the invention, the oil based power plant 2 only needs to produce saturated steam. Heating, superheating and/or reheating is provided by means of the molten salts solar thermal power plant 4. With a hybrid solar power plant 1 according to the invention, the operating temperatures of the oil based power plant 2 of the hybrid solar thermal power plant 1 are relatively lower, thereby decreasing thermal losses and increasing efficiency with respect to the conventional prior art oil based solar thermal power plant.

Figure 4:
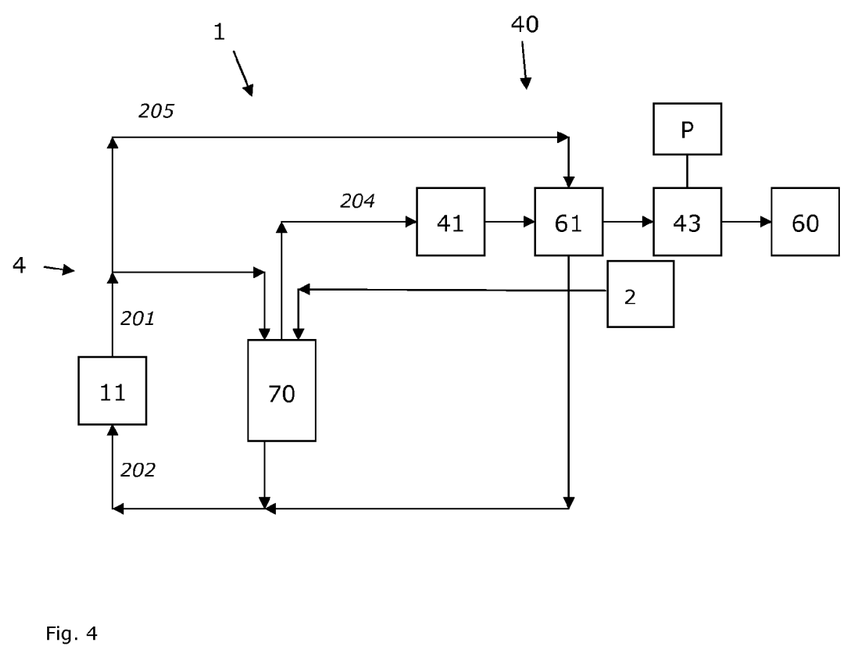
FIG. 4 shows a schematic diagram of a second embodiment of the hybrid solar thermal power plant according to the invention.

In FIG. 4 a further embodiment of the hybrid solar thermal power plant 1 according to the invention is shown. Said hybrid solar thermal power plant 1 is partly similar to the plant 1 according to the first embodiment described with FIG. 3. For the description of the different elements of the plant 1 that have been described in detail with FIG. 3, reference is made to the description with FIG. 3. Additionally, the hybrid solar thermal power plant 1 comprises a turbine 40 comprising a first turbine section 41 for generating electricity by means of the superheated steam provided by the first storage facility 70 (arrow 204). The turbine 40 further comprises a reheating section 61 provided downstream of the first turbine section 41. The reheating section 61 is configured to reheat the exhaust steam coming from the first turbine section 41 to a temperature of approximately 520-540° C. by means of the heated molten salts mixture supplied from the solar collection system 11 (arrow 205). In the first storage facility 70, heated molten salts mixture with a temperature of approximately 550° C., coming from the solar collection system 11 is stored in an upper part of said facility 70. Steam coming from the oil based solar thermal power plant 2, as described with the embodiment of FIG. 3, which is saturated steam, is heated inside the first storage facility 70. Relatively cold molten salts mixture, of approximately 390° C. is stored in a lower part of the storage facility 70 and subsequently recycles back to the solar collection system 11. The turbine 40 also comprises a second turbine section 43 provided downstream of the reheating section 61. In the second turbine section 43 the reheated steam is used to generate electricity P as well. With such a turbine configuration used in the hybrid solar thermal power plant 1 according to the invention, the efficiency of the turbine 40 is increased.

Figure 5:
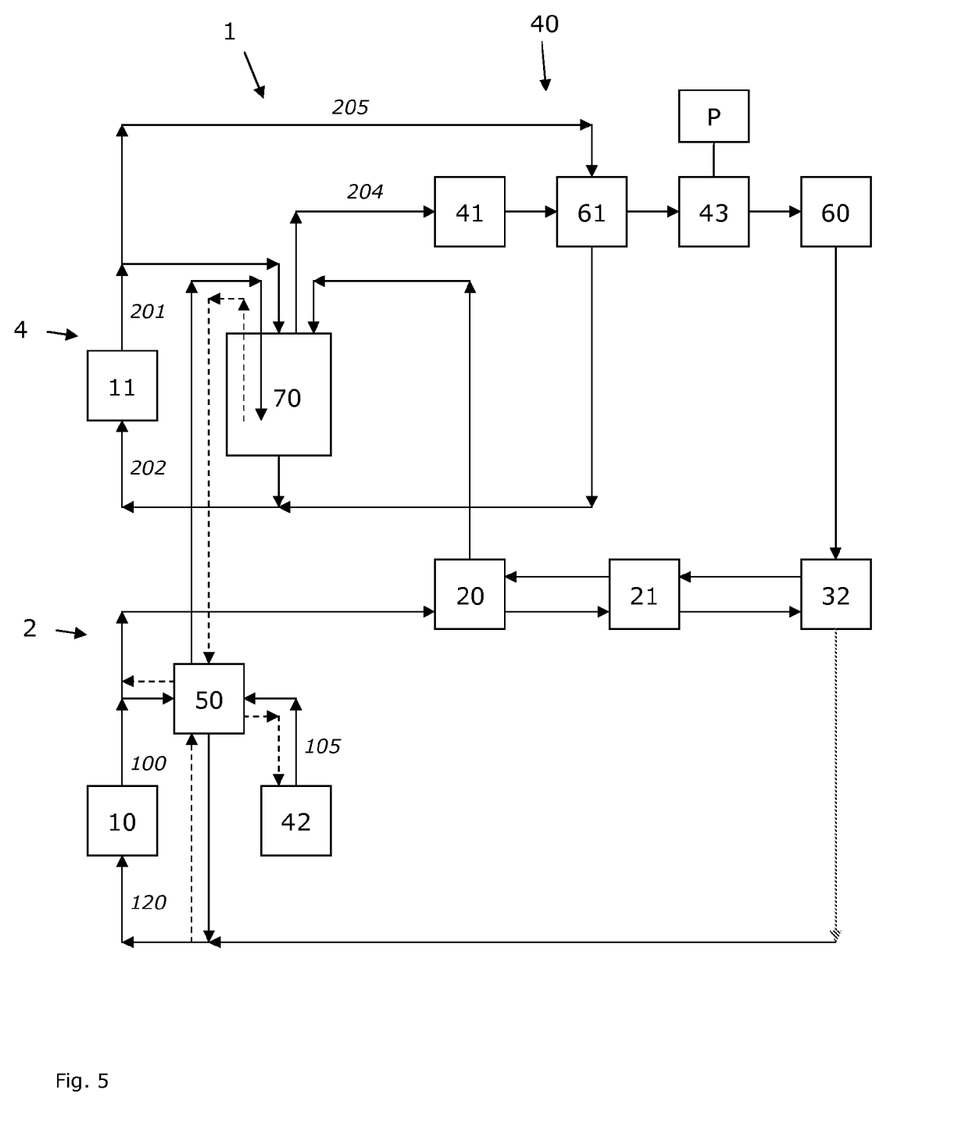
FIG. 5 shows a schematic diagram of a third embodiment of the hybrid solar thermal power plant according to the invention.

FIG. 5 shows a third embodiment of the hybrid solar power plant 1 according to the invention. Only the differences with respect to the first and second embodiment of the hybrid solar power plant 1 according to the invention will be described. For the elements of the hybrid solar power plant 1 that have been described before with FIGS. 1-4, reference is made to the description referring to said Figures.

The hybrid solar thermal power plant 1 as shown in FIG. 5 additionally comprises a hot oil/cold molten salts mixture heat exchanger 50 that is provided downstream of the solar collection system 10 of the oil based solar thermal power plant 2 as well as downstream the first storage facility 70. A molten salts mixture storage tank 42 is provided in fluid connection with the hot oil/cold molten salts mixture heat exchanger 50 for storing relatively cold molten salts mixture (having a temperature of approximately 290° C.). The hot oil/cold molten salts mixture heat exchanger 50 is configured for heating the cold molten salts mixture by means of the hot oil with a temperature of approximately 390° C. coming from the solar collection system 10 of the oil based solar thermal power plant 2. When solar radiation is present, part of the hot oil (arrow 100) coming from the solar collection system 10 is supplied to the hot oil/molten salts mixture heat exchanger 50 in which the cold molten salts mixture coming from the molten salts storage tank 42 is heated to approximately 380° C. Subsequently, the heated molten salts mixture is supplied to the bottom of the first storage facility 70. In case of absence of radiation, the medium temperature molten salts mixture coming from the lower side of the first storage facility 70 is used for heating the cold oil in the hot oil/cold molten salts mixture heat exchanger 50 in a reverse mode. It is possible to initially reheat the exhaust steam coming from the first turbine section 41 by means of the hot oil of the oil based solar thermal power plant 2 via a further heat exchanger (not shown) provided between the first turbine section 41 and the reheating section 61 of the turbine 40.

Figure 6:
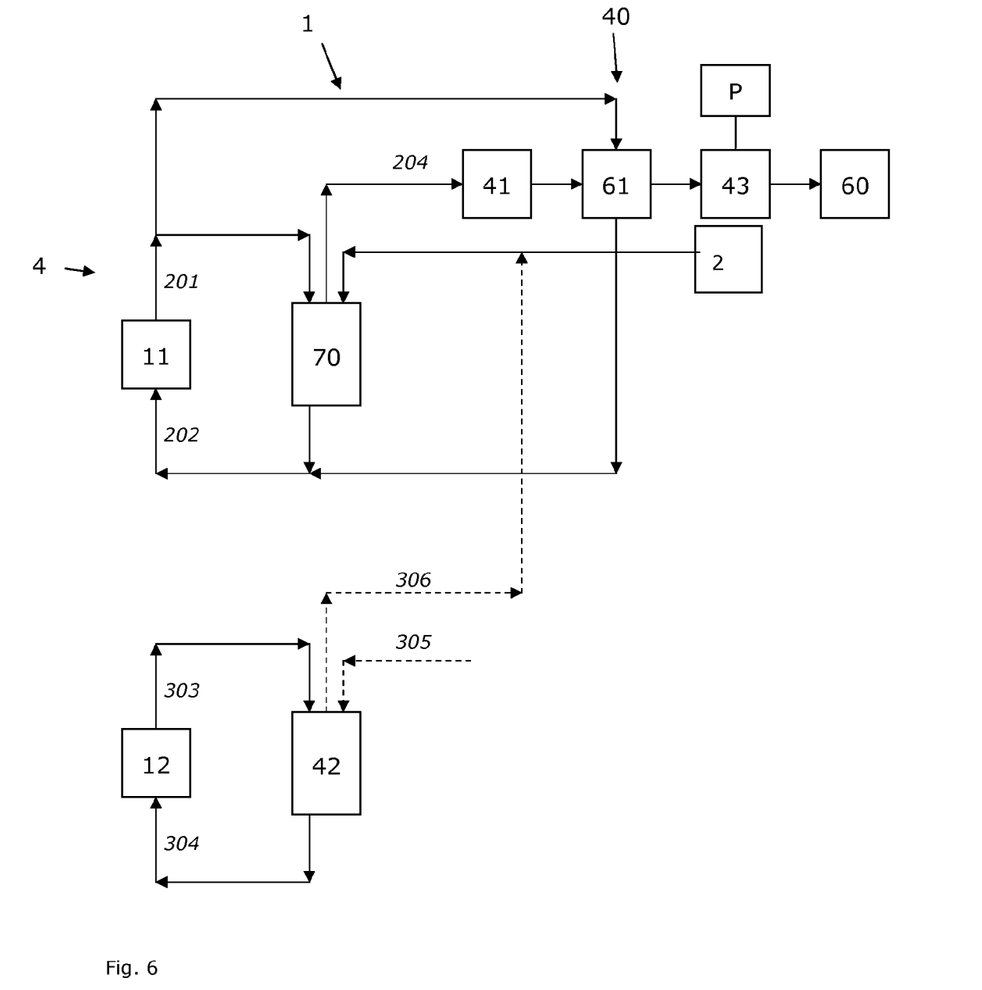
FIG. 6 shows a schematic diagram of a fourth embodiment of the hybrid solar thermal power plant according to the invention.

A fourth embodiment of the hybrid solar thermal power plant 1 is shown in FIG. 6. The hybrid solar thermal power plant 1 comprises a similar oil based solar thermal power plant 2 and a similar molten salts based solar thermal power plant 4 as described with the second embodiment of FIG. 4. Therefore, for the detailed description of the elements of said plants 2, 4 reference is made to at least the description of FIG. 4. The hybrid solar thermal power plant 1 according to FIG. 6 further comprises an additional solar collection system 12 provided in fluid connection with the molten salts mixture storage tank 42. The solar collection system 12 is configured for heating the cold molten salts mixture to a temperature of approximately 390° C. The molten salts mixture storage tank 42 is configured for receiving and storing medium temperature molten salts mixture (of approximately 390° C.) at an upper part of the tank 42 and for receiving and storing cold molten salts mixture (of approximately 290° C.) in a lower part of the tank 42. In the tank 42 boiler feed water (arrow 305) is vaporized and superheated to approximately 380° C. in case no solar radiation is available. Then the steam is supplied (arrow 306) to the first storage facility 70 in which the steam is heated further to generated superheated steam that is subsequently provided to the first turbine section 41. Cold molten salts mixture coming from the cold molten salts tank 42 is recycled back (arrow 304) to the additional solar collection system 12. It is possible to initially reheat the exhaust steam coming from the first turbine section 41 by means of the hot oil of the oil based solar thermal power plant 2 or by means of the medium temperature molten salts mixture coming from the molten salts storage tank 42 via a further heat exchanger (not shown) provided between the first turbine section 41 and the reheating section 61 of the turbine 40.

Figure 7:
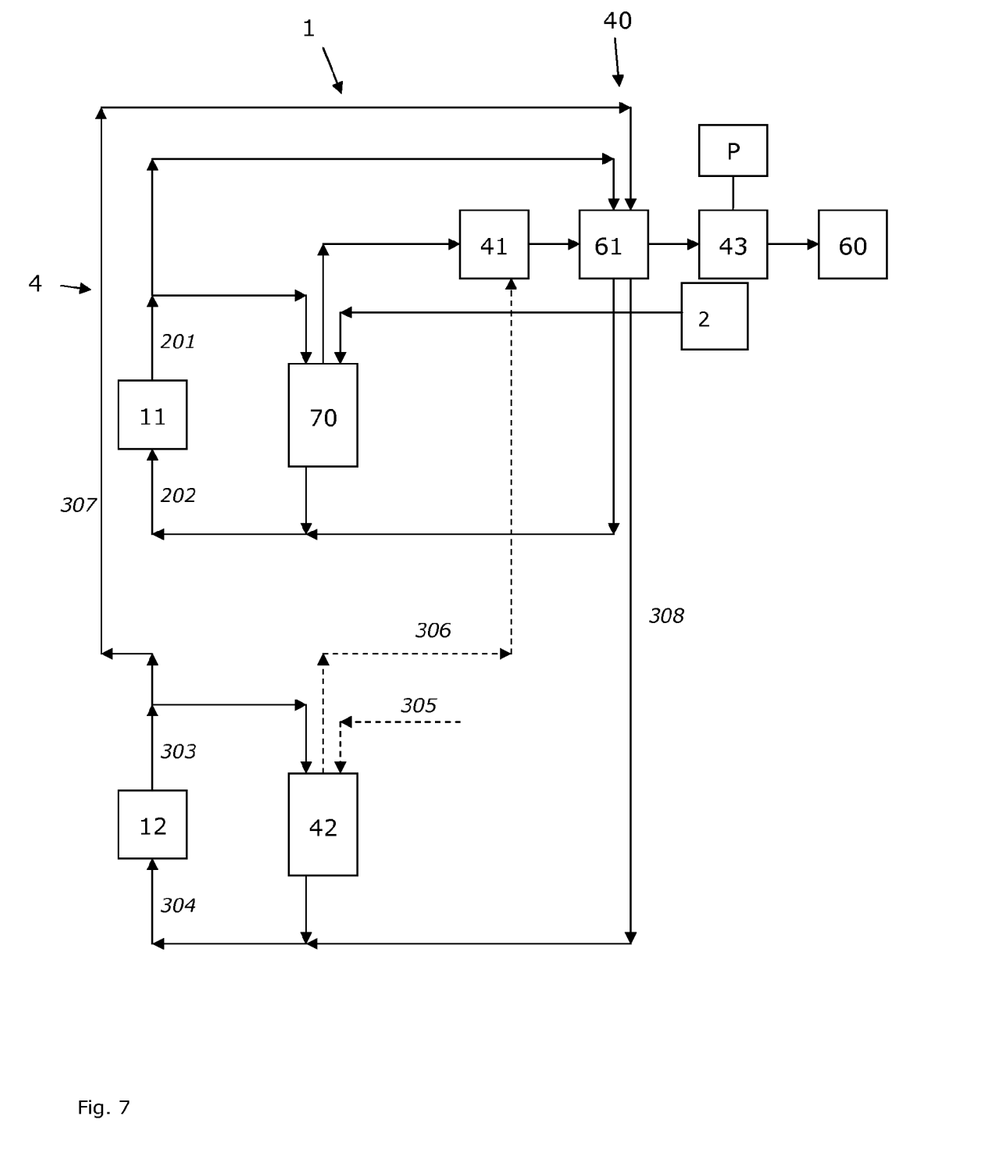
FIG. 7 shows a schematic diagram of a fifth embodiment of the hybrid solar thermal power plant according to the invention.

In FIG. 7 a fifth embodiment of the hybrid solar thermal power plant 1 according to the invention is shown. Since this embodiment resembles the fourth embodiment to a large extend, reference is made to the description of at least the embodiment shown in FIG. 6. Only the differences with respect to that embodiment will now be described in detail. In the embodiment of the hybrid solar thermal power plant as shown in FIG. 7, the additional solar collection system 12 is provided in fluid connection with the reheating section 61 of the turbine 40. The molten salts mixture storage tank 42 is provided in fluid connection with the first turbine section 41 of the steam turbine 40. In this shown embodiment, the additional solar collection system 12 is configured to heat the molten salts mixture to a temperature of approximately 550° C. The heated molten salts mixture may be provided to the reheating section 61 (arrow 307) of the turbine 40 to reheat the exhaust steam coming from the first turbine section 41 to a temperature of approximately 520-540° C. before supplying it to the second turbine section 43 for generating electricity, thereby increasing the efficiency of the turbine 40. After transferring heat to the reheating section, the cooled down molten salts mixture is recycles to the additional solar collection system 12 (arrow 308).

In case of absence of solar radiation, the hot molten salts mixture provided in the storage tank 42 is used to vaporize the boiler feed water and to superheat the thus formed steam to a temperature of approximately 540° C. The superheated steam is directly supplied to the first turbine section 41 to generate electricity.

As is described before, the hybrid solar thermal power plant 1 according to the different embodiments at least described with FIGS. 3-7 provide the advantage that due to the fact that only saturated steam needs to be produced by the oil based solar thermal power plant 2 before supplying it to the solar based thermal power plant 4 of the hybrid solar thermal power plant, the temperatures of the hot oil and thus the bulk temperature and the film temperature of the hot oil in the heat exchanger of the oil based solar thermal power plant will be relatively low as well. Consequently, degradation of the hot oil will be minimized, the lifetime of the oil is extended and the performance of the heat exchanger will not, or at least to a lesser extent, be influenced by coke formation.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. Reference throughout this specification to "one embodiment" or "an embodiment" means that a particular feature, structure or characteristic described in connection with the embodiment is included in at least one embodiment in the present invention. Thus, the appearances of the phrases "in one embodiment" or "in an embodiment" in various places throughout this specification are not necessarily all referring to the same embodiment. Furthermore, it is noted that particular features, structures or characteristics of one or more embodiments may be combines in any suitable manner to form new, not explicitly described embodiments.

What is claimed is:

1. Method for modifying a solar thermal power plant operating on conventional oil based technology into a hybrid solar thermal power plant, wherein the method comprises:
   providing an oil based solar thermal power plant comprising a solar collection system with at least one radiation absorber tube containing a heat transfer oil to be heated by the solar collection system, wherein said oil based solar thermal power plant is configured to provide saturated steam to the hybrid solar thermal power plant;
   providing a solar thermal power system operating on a molten salts mixture, wherein the molten salts solar thermal power system comprises a solar collection system to heat a molten salts mixture;
   coupling of the molten salts solar thermal power system to the oil based solar thermal power plant such that the hybrid solar thermal power plant is configured to heat medium temperature steam that is generated by the oil based solar power plant by the molten salts mixture thereby producing high temperature steam and subsequently supplying it to a steam turbine to generate electricity; and
   adding a storage facility to store the molten salts mixture and to heat inside the storage facility the medium temperature steam coming from the oil based solar power plant and/or to heat inside said storage facility boiler feed water to generate and to heat steam by the stored hot molten salts mixture,
   providing the turbine with a reheating section in fluid connection with the solar collection system of the molten salts solar thermal power system for reheating steam coming from a first turbine section before supplying it to a second turbine section to generate electricity, and
   wherein the reheating section is provided in fluid connection with an additional solar collection system configured for heating an additional molten salts mixture in an additional storage facility to heat steam generated from supplied boiler feed water.

2. Method according to claim 1, wherein the hybrid solar thermal power plant is configured for heating steam to at least 450° C.

3. Method according to claim 1, wherein steam is reheated or superheated at a pressure ranging between approximately 50-120 bar.

4. Method according to claim 1, wherein the medium temperature steam coming from the oil based solar power plant is heated inside said storage facility to superheated steam that is supplied to said steam turbine.

5. Method according to claim 1, wherein the method comprises providing a back-up boiler system for heating the molten salts mixture and/or preheating boiler feed water.

6. Method according to claim 1, wherein the reheating section is provided in fluid connection with an additional solar collection system configured for heating an additional molten salts mixture to reheat the steam coming from the first turbine section before supplying it to the second turbine section to generate electricity.

7. Method according to claim 1, wherein the method comprises providing the reheating section in fluid connection with the solar collection system of the oil based solar thermal power plant and/or with a molten salts storage tank of the oil based solar thermal power plant to reheat the steam coming from the first turbine section.

8. Method according to claim 1, wherein a further hot oil/cold molten salts mixture heat exchanger is provided that heats the molten salt mixture supplied by a storage facility by the oil that is heated by the solar collection system of the oil based solar thermal power plant.

9. Hybrid solar thermal power plant comprising an oil based solar thermal power plant with a solar collection system having at least one radiation system with at least one radiation absorber tube in which heat transfer oil is received to be heated by the solar collection system, wherein said oil based solar thermal power plant is configured to provide saturated steam to the hybrid solar thermal power plant, wherein the hybrid solar thermal power plant also comprises a molten salts solar thermal power system with at least one solar collection system to heat a molten salts mixture and a storage facility configured to store the molten salts mixture and to exchange heat from the molten salts mixture to heat inside the storage facility medium temperature steam supplied by the oil based thermal power plant and/or to heat inside said storage facility boiler feed water to generate and to heat steam by the stored hot molten salts mixture, wherein a steam turbine is provided to generate electricity by the heated medium temperature steam,
- wherein the turbine comprises a reheating section for reheating steam before generating electricity,
- wherein the reheating section is in fluid connection with the solar collection system of the molten salts solar thermal power system for reheating steam coming from a first turbine section before supplying it to a second turbine section to generate electricity, and
- wherein the reheating section is in fluid connection with an additional solar collection system configured for heating an additional molten salts mixture in an additional storage facility to heat steam generated from supplied boiler feed water.

10. Hybrid solar thermal power plant according to claim 9, wherein the hybrid solar thermal power plant is configured to heat steam to a temperature of at least 450° C.

11. Hybrid solar thermal power plant according to claim 9, wherein the medium temperature steam is heated inside said storage facility to superheated steam that is supplied to said steam turbine.

12. Hybrid solar thermal power plant according to claim 9, further comprising a back-up boiler system to heat the molten salts mixture and/or to preheat boiler feed water.

13. Hybrid solar thermal power plant according to claim 9, wherein the hybrid solar thermal power plant is provided with a hot oil/cold molten salts mixture heat exchanger in fluid connection with the storage facility for heating the molten salts mixture coming from the storage facility by heated oil from the oil based solar thermal power plant.

14. Hybrid solar thermal power plant according to claim 9, further comprising an additional solar collection system configured for heating an additional molten salts mixture to reheat steam coming from a first turbine section before supplying it to a second turbine section to generate electricity and/or for heating the additional molten salts mixture in an additional storage facility to heat steam generated from supplied boiler feed water.

15. Hybrid solar thermal power plant according to claim 9, wherein the reheating section is in fluid connection with an additional solar collection system configured for heating an additional molten salts mixture to reheat the steam coming from the first turbine section before supplying it to the second turbine section to generate electricity.

16. Hybrid solar thermal power plant according to claim 9, wherein the reheating section is in fluid connection with the solar collection system of the oil based solar thermal power plant and/or with a molten salts storage tank of the oil based solar thermal power plant to reheat the steam coming from the first turbine section.

17. Method according to claim 1, wherein the reheating section is provided in fluid connection with an additional solar collection system configured for heating an additional molten salts mixture in a storage facility to heat in the storage facility steam generated from supplied boiler feed water to superheated steam.

18. Method according to claim 1, the method further comprising:
- providing a first fluid connection for molten salts from said additional solar collection system to said additional molten salts storage facility;
- providing a second fluid connection for cold molten salt from said additional molten salts storage facility to said additional solar collection system;
- providing an inlet for boiler feed water of said additional molten salts storage facility;
- providing a third fluid connection for steam from said additional molten salts storage facility to said storage facility; and
- providing a fourth fluid connection for superheated steam from said storage facility to said first turbine section.

19. Hybrid solar thermal power plant according to claim 9, wherein the plant comprises:
- a first fluid connection for molten salts from said additional solar collection system to said additional molten salts storage facility;
- a second fluid connection for cold molten salt from said additional molten salts storage facility to said additional solar collection system;
- an inlet for boiler feed water of said additional molten salts storage facility;
- a third fluid connection for steam from said additional molten salts storage facility to said storage facility; and
- a fourth fluid connection for superheated steam from said storage facility to said first turbine section.

* * * * *

UNITED STATES PATENT AND TRADEMARK OFFICE
CERTIFICATE OF CORRECTION

PATENT NO.         : 9,771,832 B2
APPLICATION NO.    : 14/400268
DATED              : September 26, 2017
INVENTOR(S)        : Gaetano Iaquaniello et al.

Page 1 of 1

It is certified that error appears in the above-identified patent and that said Letters Patent is hereby corrected as shown below:

On the Title Page

Item (71), (Applicants), Change "STAMICARBON B.V., Sittard (NL)" to
--STAMICARBON B.V. acting under the name of MT INNOVATION CENTER, Sittard (NL)--.

Item (73), (Assignees), Change "STAMICARBON B.V. (NL)" to
--STAMICARBON B.V. acting under the name of MT INNOVATION CENTER (NL)--.

In the Specification

In Column 6 at Line 65, Change "might" to --night--.

In Column 7 at Line 10, Change "power." to --power--.

In Column 7 at Line 26, Change "form" to --from--.

Signed and Sealed this
Seventeenth Day of April, 2018

Andrei Iancu
*Director of the United States Patent and Trademark Office*